United States Patent
Narayanan et al.

(10) Patent No.: US 9,894,002 B1
(45) Date of Patent: *Feb. 13, 2018

(54) DOUBLE EXPERIMENTAL (EXP) QUALITY OF SERVICE (QOS) MARKINGS FOR MPLS PACKETS

(71) Applicant: Juniper Networks, Inc., Sunnyvale, CA (US)

(72) Inventors: Mahesh Narayanan, San Jose, CA (US); Nayan S. Patel, Bedford, MA (US); Vidur Gupta, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,757

(22) Filed: May 27, 2016

Related U.S. Application Data

(63) Continuation of application No. 14/319,803, filed on Jun. 30, 2014, now Pat. No. 9,356,857.

(51) Int. Cl.
- *H04L 12/723* (2013.01)
- *H04L 12/833* (2013.01)
- *H04L 12/851* (2013.01)
- *H04L 12/857* (2013.01)
- *H04L 12/725* (2013.01)

(Continued)

(52) U.S. Cl.
CPC .............. *H04L 47/24* (2013.01); *H04L 45/50* (2013.01); *H04L 47/17* (2013.01)

(58) Field of Classification Search
CPC ... H04L 45/302; H04L 45/502; H04L 45/507; H04L 47/24; H04L 45/50; H04L 47/17
See application file for complete search history.

(56) References Cited

U.S. PATENT DOCUMENTS

| | | | |
|---|---|---|---|
| 7,174,427 B2 * | 2/2007 | Ramia | H04L 45/50 711/132 |
| 7,257,121 B2 * | 8/2007 | Kuhl | H04L 47/10 370/389 |

(Continued)

OTHER PUBLICATIONS

Le Faucheur et al. "Multi-Protocol Label Switching (MPLS) Support of Differentiated Services" Network Working Group, RFC 3270, May 2002, 64 pgs.

(Continued)

*Primary Examiner* — Ahmed Elallam
(74) *Attorney, Agent, or Firm* — Shumaker & Sieffert, P.A.

(57) ABSTRACT

Techniques are described for applying double experimental (EXP) quality of service (QoS) markings to Multiprotocol Label Switching (MPLS) packets. According to the techniques, an edge router of an MPLS network is configured to map a Differentiated Services Code Point (DSCP) marking for customer traffic to at least two EXP fields of at least two different labels included in a MPLS packet encapsulating the customer traffic. In this way, the edge router may map the full DSCP marking across the first and second EXP fields to provide full resolution QoS for the customer traffic over the MPLS network. The techniques also include a core router of an MPLS network configured to identify a QoS profile for a received MPLS packet based on a combination of a first EXP field of a first label and a second EXP field of a second label included in the MPLS packet.

15 Claims, 6 Drawing Sheets

(51) Int. Cl.
*H04L 12/803* (2013.01)
*H04L 12/701* (2013.01)
*H04L 12/741* (2013.01)
*H04L 12/801* (2013.01)

(56) References Cited

U.S. PATENT DOCUMENTS

| | | | |
|---|---|---|---|
| 7,386,630 B2 | 6/2008 | Liong et al. | |
| 7,613,209 B1 | 11/2009 | Nguyen et al. | |
| 7,684,391 B2 | 3/2010 | Liu | |
| 7,688,725 B2 | 3/2010 | Sami et al. | |
| 7,848,321 B2* | 12/2010 | Akahane | H04L 45/00 370/389 |
| 8,000,327 B1* | 8/2011 | Minei | H04L 45/306 370/392 |
| 8,077,608 B1 | 12/2011 | Arad et al. | |
| 8,804,736 B1* | 8/2014 | Drake | H04L 12/462 370/392 |
| 8,976,680 B2* | 3/2015 | Kompella | H04L 45/00 370/241.1 |
| 9,185,035 B2* | 11/2015 | Ra | H04L 45/745 |
| 9,356,857 B1 | 5/2016 | Narayanan et al. | |
| 9,467,367 B2* | 10/2016 | Bryant | H04L 45/50 |
| 2003/0053414 A1 | 3/2003 | Akahane et al. | |
| 2003/0053464 A1* | 3/2003 | Chen | H04L 45/302 370/400 |
| 2004/0223498 A1* | 11/2004 | Sanderson | H04L 12/4641 370/395.52 |
| 2006/0182127 A1 | 8/2006 | Park | |
| 2007/0133559 A1* | 6/2007 | Ko | H04L 12/5695 370/395.21 |
| 2007/0206602 A1* | 9/2007 | Halabi | H04L 12/5693 370/395.4 |
| 2008/0317045 A1* | 12/2008 | Chen | H04L 45/50 370/400 |
| 2010/0202312 A1* | 8/2010 | Eswaran | H04L 45/04 370/252 |
| 2011/0002335 A1 | 1/2011 | Boodaghians | |
| 2012/0314593 A1* | 12/2012 | Liu | H04L 47/18 370/252 |
| 2014/0146820 A1* | 5/2014 | Rabie | H04L 12/4604 370/392 |

OTHER PUBLICATIONS

Prosecution History from U.S. Pat. No. 9,356,857, dated Oct. 2, 2015 through Feb. 1, 2016, 23 pp.

* cited by examiner

FIG. 6A

| TOP EXP | BOTTOM EXP | PRIORITY |
|---------|------------|----------|
| SERVICE PROVIDER INTERNAL MARKINGS |||
| 111 | 111 | HIGHEST |
| 000 | 000 | LOWEST |

FIG. 6B

| CUSTOMER MARKINGS | | | SERVICE PROVIDER MARKINGS | | |
|---|---|---|---|---|---|
| CUSTOMER | DSCP | PRIORITY | TOP EXP | BOTTOM EXP | PRIORITY |
| A | 111111 | HIGHEST | 111 | 111 | HIGHEST |
|   | 000000 | LOWEST | 000 | 000 | LOWEST |
| B | 000000 | HIGHEST | 111 | 111 | HIGHEST |
|   | 111111 | LOWEST | 000 | 000 | LOWEST |

DOUBLE EXPERIMENTAL (EXP) QUALITY OF SERVICE (QOS) MARKINGS FOR MPLS PACKETS

This application is a continuation of U.S. application Ser. No. 14/319,803, filed Jun. 30, 2014, the entire contents of which are incorporated by reference herein.

TECHNICAL FIELD

The invention relates to computer networks and, more particularly, engineering traffic within a network.

BACKGROUND

Routing devices within a network, often referred to as routers, maintain tables of routing information that describe available routes through the network. Upon receiving an incoming packet, the router examines information within the packet and forwards the packet in accordance with the routing information. In order to maintain an accurate representation of the network, routers exchange routing information in accordance with a defined routing protocol, such as Interior Gateway Protocol (IGP) or Border Gateway Protocol (BGP).

Multi-protocol Label Switching (MPLS) is a suite of protocols used to engineer traffic patterns within Internet Protocol (IP) networks. By utilizing MPLS, an ingress or root node can request a path through a network to an egress or leaf node, i.e., a Label Switched Path (LSP). An LSP defines a distinct path through the network to carry MPLS packets from the ingress node to the egress node. A short label associated with a particular LSP is affixed to packets that travel through the network via the LSP. Routers along the path cooperatively perform MPLS operations to forward the MPLS packets along the established path. A variety of protocols exist for establishing LSPs, e.g., the Label Distribution Protocol (LDP) and the Resource Reservation Protocol with Traffic Engineering extensions (RSVP-TE). LSPs may be used for a variety of traffic engineering purposes including bandwidth management and quality of service (QoS).

SUMMARY

In general, this disclosure describes techniques for applying double experimental (EXP) quality of service (QoS) markings to Multiprotocol Label Switching (MPLS) packets. In some examples, a service provider may offer several different service levels defined as QoS profiles for forwarding traffic between customer devices over a MPLS network. Conventionally, the customer devices may use Differentiated Services Code Point (DSCP) markings to identify the corresponding QoS profile for customer traffic, and edge routers of the MPLS network may map the six-bit DSCP markings to a three-bit EXP field of a label in a MPLS header for forwarding the customer traffic across the MPLS network. The QoS resolution for the customer traffic, therefore, is lost within the MPLS network.

According to the techniques of this disclosure, an edge router of an MPLS network is configured to map a DSCP marking for customer traffic to at least two EXP fields of at least two different labels included in a MPLS header of the MPLS packet encapsulating the customer traffic. In this way, the edge router may map the six bits of the DSCP marking to six bits shared across the first and second EXP fields to provide full resolution, end-to-end QoS for the customer traffic over the MPLS network. The techniques described in this disclosure also include a core router of an MPLS network configured to identify a QoS profile for a received MPLS packet based on a combination of a first EXP field of a first label and a second EXP field of a second label included in the MPLS header of the MPLS packet. The core router then forwards the MPLS packet to a next hop router in the MPLS network in accordance with the identified QoS profile.

In one example, this disclosure is directed toward a method comprising receiving, at a core router of a MPLS network, a MPLS packet that includes a first label with a first EXP field and a second label with a second EXP field, identifying a QoS profile for the MPLS packet based on a combination of the first EXP field and the second EXP field, selecting a next hop router for the MPLS packet from a forwarding table based at least on the identified QoS profile, and forwarding the MPLS packet to the next hop router in the MPLS network in accordance with the identified QoS profile.

In another example, this disclosure is directed toward a core router of a MPLS network, the core router comprising an interface for receiving a MPLS packet that includes a first label with a first EXP field and a second label with a second EXP field. The core router further comprises a forwarding engine configured to identifying a QoS profile for the MPLS packet based on a combination of the first EXP field and the second EXP field, select a next hop router for the MPLS packet from a forwarding table based at least on the identified QoS profile, and forwarding the MPLS packet to the next hop router in the MPLS network in accordance with the identified QoS profile.

In a further example, this disclosure is directed toward a computer-readable storage medium comprising instructions that when executed cause one or more processors to receive, at a core router of a MPLS network, a MPLS packet that includes a first label with a first EXP field and a second label with a second EXP field, identify a QoS profile for the MPLS packet based on a combination of the first EXP field and the second EXP field, select a next hop router for the MPLS packet from a forwarding table based at least on the identified QoS profile, and forward the MPLS packet to the next hop router in the MPLS network in accordance with the identified QoS profile.

In another example, this disclosure is directed toward a method comprising receiving, at an edge router of a MPLS network from a customer device, traffic that includes a DSCP marking, identifying a QoS profile for the traffic based on the DSCP marking, mapping a first portion of the DSCP marking to a first EXP field of a first label included in a MPLS packet that encapsulates the traffic, mapping a second portion of the DSCP marking to a second EXP field of a second label included in the MPLS packet that encapsulates the traffic, and forwarding the MPLS packet to a next hop router in the MPLS network in accordance with the identified QoS profile.

In a further example, this disclosure is directed toward an edge router of a MPLS network, the edge router comprising an interface for receiving traffic from a customer device that includes a DSCP marking. The edge router further comprises a forwarding engine configured to identify a QoS profile for the traffic based on the DSCP marking, map a first portion of the DSCP marking to a first EXP field of a first label included in a MPLS packet that encapsulates the traffic, map a second portion of the DSCP marking to a second EXP field of a second label included in the MPLS packet that encapsulates the traffic, and forward the MPLS packet to a next hop router in the MPLS network in accordance with the identified QoS profile.

In another example, this disclosure is directed toward a computer-readable medium comprising instructions that when executed cause one or more processors to receive, at an edge router of a MPLS network from a customer device, traffic that includes a DSCP marking, identify a QoS profile for the traffic based on the DSCP marking, map a first portion of the DSCP marking to a first EXP field of a first label included in a MPLS packet that encapsulates the traffic, map a second portion of the DSCP marking to a second EXP field of a second label included in the MPLS packet that encapsulates the traffic, and forward the MPLS packet to a next hop router in the MPLS network in accordance with the identified QoS profile.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 6A-6B are conceptual diagrams illustrating example QoS mapping tables of customer QoS markings, service provider double EXP QoS markings, and QoS profiles maintained by the router from FIG. 2.

DETAILED DESCRIPTION

Figure 1:
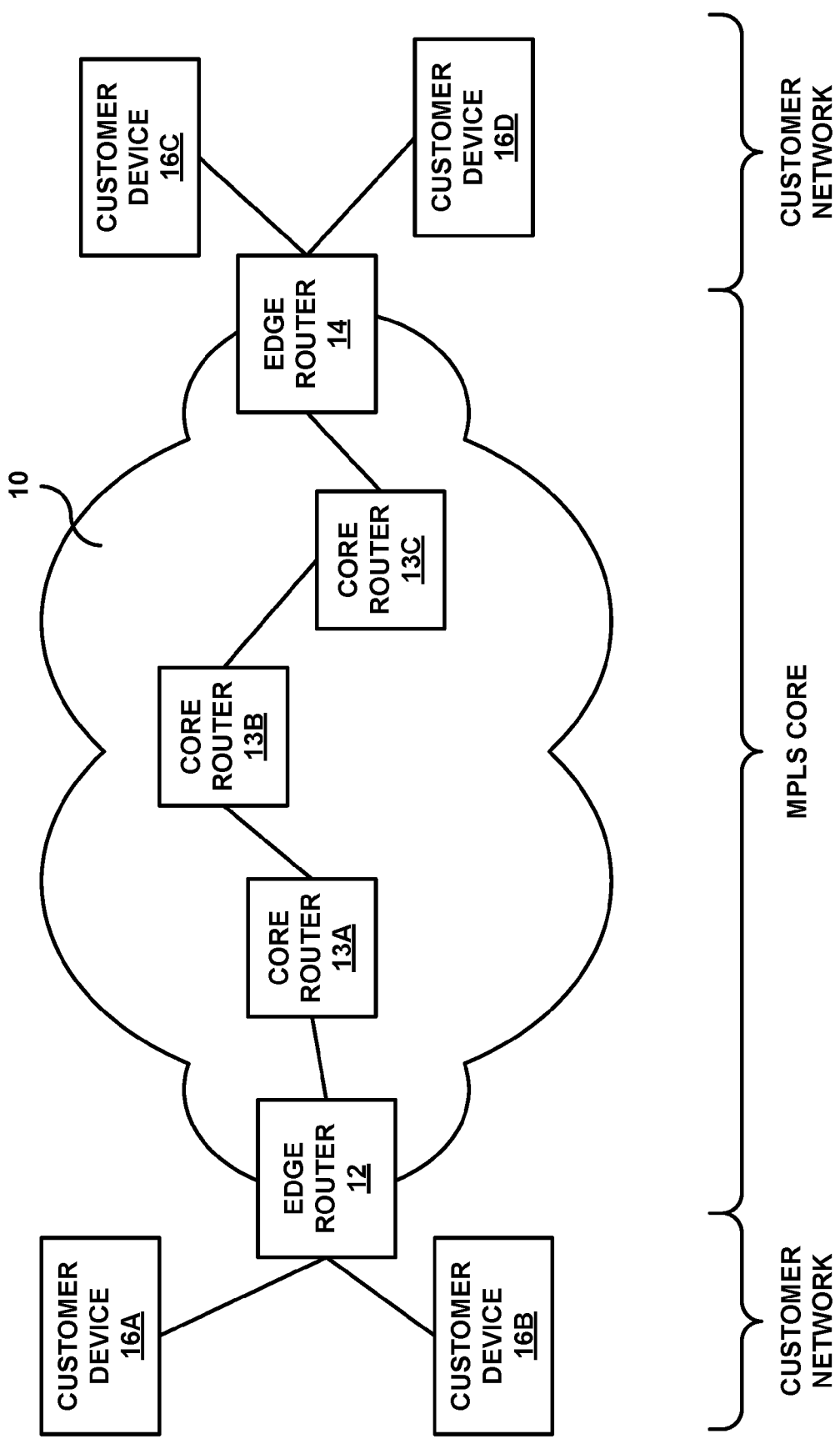
FIG. 1 is a block diagram illustrating an example service provider system that includes a Multiprotocol Label Switching (MPLS) core network with edge routers and core routers configured to forward MPLS packets with double experimental (EXP) quality of service (QoS) markings.

FIG. 1 is a block diagram illustrating an example service provider system that includes an Multiprotocol Label Switching (MPLS) core network 10 with edge routers 12, 14 and core routers 13A-13C ("core routers 13") configured to forward MPLS packets with double experimental (EXP) quality of service (QoS) markings. The service provider system illustrated in FIG. 1 includes customer devices 16A-16D ("customer devices 16") arranged in customer networks and connected over MPLS core network 10. As described in more detail below, the techniques described in this disclosure provide full resolution, end-to-end QoS for customer devices 16 over MPLS core network 10.

The customer networks may be local area networks (LANs), wide area networks (WANs), or other private networks that include a plurality of customer devices 16. In some examples, the customer networks may comprise distributed network sites of the same customer enterprise. In other examples, the customer networks may belong to different entities. Customer devices 16 may include personal computers, laptops, workstations, personal digital assistants (PDAs), wireless devices, network-ready appliances, file servers, print servers or other devices capable of accessing MPLS core network 10.

MPLS core network 10 may comprise a service provider network. For example, MPLS core network 10 may comprise an Internet Protocol (IP) network, such as the Internet or another public network, which uses MPLS protocols to engineer traffic patterns over an MPLS core of the IP network. By utilizing MPLS, edge routers 12, 14 can request distinct paths, i.e., label switched paths (LSPs), through MPLS core network 10 to carry MPLS packets between customer devices 16 in the customer networks. A short label associated with a particular LSP is affixed to the MPLS packets that travel through MPLS core network 10 via the LSP. Core routers 13 along the path cooperatively perform MPLS operations to forward the MPLS packets along the established path. A variety of protocols exist for establishing LSPs, e.g., the Label Distribution Protocol (LDP) and the Resource Reservation Protocol with Traffic Engineering extensions (RSVP-TE). In some examples, MPLS core network 10 may comprise a layer 3 virtual private network (L3VPN) established across the IP network to connect customer devices 16 in the customer networks.

Edge routers 12, 14 and core routers 13 in MPLS core network 10 each maintain routing information that describes available routes through MPLS core network 10. In order to maintain an accurate representation of MPLS core network 10, the routers exchange intra-network routing information using advertisements in a defined routing protocol, such as an Interior Gateway Protocol (IGP). In addition, edge routers 12, 14 each maintain routing information that describes available routes between MPLS core network 10 and other remote customer networks. For example, edge routers 12, 14 may use border gateway protocol (BGP) to exchange inter-network routing information with edge routers of the customer networks (not shown). Edge routers 12, 14 and core routers 13 generate forwarding information based on the routing information that allows for forwarding of the MPLS packets along particular LSPs based on labels included in the MPLS packets.

In one example, edge router 12 may operate as an ingress edge router to MPLS core network 10 and receive IP packets or other traffic from customer device 16A, for example. In order to forward the customer traffic over MPLS core network 10, edge router 12 encapsulates the customer traffic in a MPLS packet having an MPLS header that includes one or more labels used to identify a path through MPLS core network 10. In some examples, a service provider may offer several different service levels defined as quality of service (QoS) profiles for forwarding traffic between customer devices 16 over MPLS core network 10. For example, the service provider may offer high priority forwarding of "mission critical" customer traffic that ensures high speed delivery of the traffic with a low packet drop rate, and also offer lower priority forwarding of "best-effort" customer traffic.

Customer devices 16 in the customer networks may use Differentiated Services Code Point (DSCP) markings carried by the IP packets to identify the QoS profile for customer traffic to be forwarded over the MPLS core network 10. The DSCP markings typically use six bits to define the different QoS profiles. The DSCP markings enable edge router 12 to provide differentiated QoS treatment to the received customer traffic. For example, edge router 12 reads the DSCP markings from the received customer IP packets, encapsulates the IP packets in MPLS packets, and forwards the MPLS packets over MPLS core network 10 in accordance with the QoS profile identified by the DSCP markings.

Within MPLS core network 10, however, core routers 13 forward the MPLS packets based only on the MPLS headers, and cannot use the DSCP markings carried by the encapsulated IP packets to identify and honor the customer's corresponding QoS profiles. Conventionally, in order to provide QoS within a MPLS core network, an edge router maps the DSCP markings of the received customer traffic to a single experimental (EXP) field of one of the labels included in the MPLS header of the MPLS packet encapsulating the customer traffic. The EXP field, however, includes only three bits as opposed to the six bits of the DSCP markings. Most core routers include eight hardware queues, which is enough to provide a separate queue for each of the three-bit EXP markings. More information regarding support of differentiated services over MPLS networks may be found in Le Faucheur, et al., "Multi-Protocol Label Switching (MPLS) Support of Differentiated Services," Internet Engineering Task Force (IETF) Network Working Group, Request for Comment (RFC) 3270, May 2002, the entire contents of which is incorporated herein by reference.

Using this conventional QoS marking technique, the QoS resolution for the customer traffic may be lost over the MPLS core network such that the mission-critical customer traffic and the best-effort customer traffic may receive similar treatment at the core routers. For example, in a case where only the three most significant bits of the DSCP markings are mapped to the EXP field of a MPLS packet, a customer whose DSCP marking has a value of 100000 that indicates mission-critical traffic, and another customer whose DSCP marking has a value of 100011 that indicate best-effort traffic, end up getting similar treatment at the core routers based on the same EXP field value of 100.

According to a recent net neutrality ruling, service providers may be able to charge customers, such as over-the-top (OTT) video content providers, a premium price to guarantee a particular level of service for the customers' traffic based on service level agreements (SLAs). Given the limitations of the conventional QoS marking techniques described above, the service providers have two solutions to guarantee the SLAs as the customer traffic flows through the MPLS core network. First, the service providers may use RSVP-TE for guaranteed performance in the MPLS core network. Second, the service providers may use dedicated separate queues, interface cards (IFCs) and markings for the customer traffic as it traverses the MPLS core network. An alternative solution is needed, however, for customers that support an LDP core or that do not provision RSVP-TE tunnels due to complexity.

According to the techniques of this disclosure, edge router 12 of MPLS core network 10 may be configured to map a DSCP marking for customer traffic to at least two EXP fields of at least two different labels included in a MPLS header of the MPLS packet encapsulating the customer traffic. In this way, edge router 12 may map the six bits of the DSCP marking to six bits shared across the first and second EXP fields so that the full QoS resolution for the customer traffic may be maintained by core routers 13 over MPLS core network 10. In addition, in some examples, edge routers 12, 14 and core routers 13 may support up to sixteen hardware queues for use with the six-bit double EXP QoS markings to provide the full resolution, end-to-end QoS for customer devices 16 over MPLS core network 10.

To perform the techniques of this disclosure, edge router 12 may map a first portion of the DSCP marking to a first EXP field of a first label and a second portion of the DSCP marking to a second EXP field of a second label included in the MPLS header. The two labels used to carry the double EXP QoS marking for the MPLS packet may be any two labels included in the MPLS header, including, for example, any two of a transport label, a service label, an entropy label, and an explicit null label. In one example, edge router 12 may map the three most significant bits of the DSCP marking to the first EXP field and the three least significant bits of the DSCP marking to the second EXP field. In this case, a customer whose DSCP marking has a value of 100000 that indicates mission-critical traffic will get mission-critical treatment at core routers 13 based on the combination of the first EXP field value of 100 and the second EXP field value of 000, and another customer whose DSCP marking has a value of 100011 that indicate best-effort traffic will get best-effort treatment at core routers 13 based on the combination of the first EXP field value of 100 and the second EXP field value of 011.

The techniques described in this disclosure also include core routers 13 of MPLS core network 10 configured to identify a QoS profile for a received MPLS packet based on a combination of a first EXP field of a first label and a second EXP field of a second label included in the MPLS header of the MPLS packet. According to the described techniques, each of core routers 13 stores QoS policies defined to map the combination of the first EXP field and the second EXP fields to one of a plurality of QoS profiles. The core routers 13 may generate forwarding tables based on routes through MPLS core network 10 and the installed QoS policies.

Upon receipt of the MPLS packet, each of core routers 13 may read both the first label and the second label from the MPLS header, concatenate or otherwise combine the first EXP field of the first label and the second EXP field of the second label, and apply the QoS policies to map the combination of the first EXP field and the second EXP field to the corresponding QoS profile. In this way, each of core routers 13 within MPLS core network 10 may select a next hop router for the MPLS packet from the forwarding table based at least on the identified QoS profile, and forward the MPLS packet to the next hop router in MPLS core network 10 in accordance with the identified QoS profile.

Figure 2:
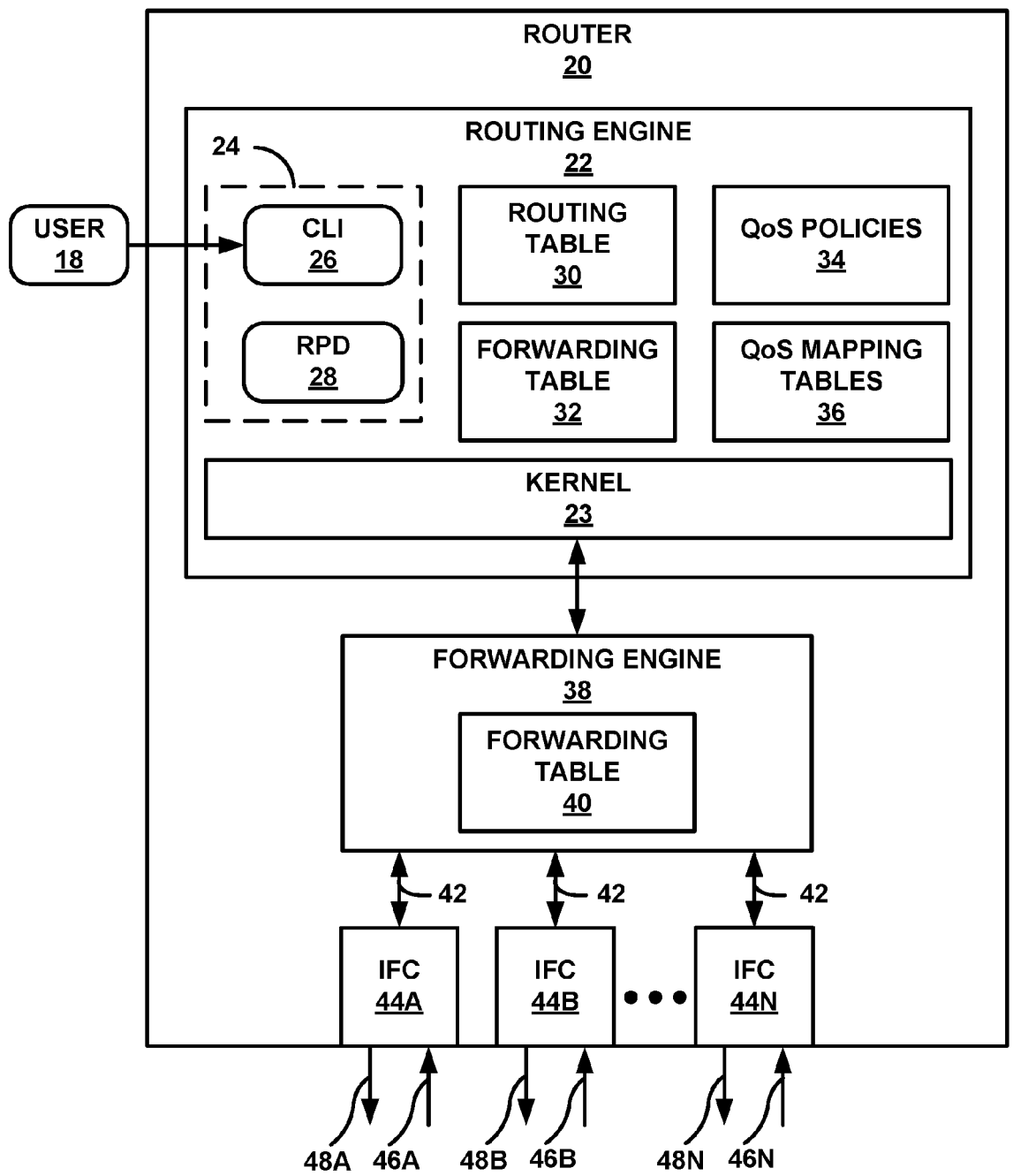
FIG. 2 is a block diagram illustrating, in further detail, an example router configured to operate as either an edge router or a core router to forward MPLS packets with double experimental (EXP) quality of service (QoS) markings.

FIG. 2 is a block diagram illustrating, in further detail, an example router 20 configured to operate as either an edge router or a core router to forward MPLS packets with double EXP QoS markings. Router 20 may, for example, represent any of edge routers 12, 14, or core routers 16 in MPLS core network 10 from FIG. 1.

As illustrated in FIG. 2, router 20 includes a routing engine 22, a forwarding engine 38, and interface cards (IFCs) 44A-44N (collectively, "IFCs 44") for communicating packets via inbound links 46A-46N ("inbound links 46") and outbound links 48A-48N ("outbound links 48"). IFCs 44 are coupled to inbound links 46 and outbound links 48 via a number of physical interface ports (not shown). Forwarding engine 38 comprises a packet forwarding engine (PFE) that sends and receives traffic via the set of IFCs 44. Although not shown in FIG. 2, forwarding engine 38 may include a central processing unit (CPU), memory and one or more programmable packet-forwarding application-specific integrated circuits (ASICs). In some examples, router 20 may include one or more additional PFEs that may be interconnected via a switch fabric configured for high-speed forwarding of incoming data packets between the PFEs for transmission over MPLS core network 10.

Routing engine 22 provides a control plane operating environment for execution of various user-level daemons 34. Daemons 34, in the illustrated example, include a command-line interface daemon 26 ("CLI 26") and a routing protocol daemon 28 ("RPD 28"). In other examples, routing engine 22 may include additional daemons 24 not shown in FIG. 2 that perform other control, management, or service plane functionality and/or drive and otherwise manage data plane functionality for router 20. Daemons 24 operate over and interact with kernel 23, which provides a run-time operating environment for user-level processes. Kernel 23 may comprise, for example, a UNIX operating system derivative such as Linux or Berkeley Software Distribution (BSD). Kernel 23 offers libraries and drivers by which daemons 24 may interact with the underlying system.

CLI 26 provides a shell by which a user 18, such as a system administrator or other management entity of a service provider, may modify the configuration of router 20 using text-based commands. In accordance with techniques described in this disclosure, when router 20 is operating as a core router, user 18 may configure QoS policies 34 defined to map double EXP QoS markings, i.e., combinations of at least two EXP fields, to a plurality of QoS profiles. Routing engine 22 receives QoS policies 34 from user 18 via CLI 26, and installs QoS policies 34 in a data structure. Moreover, in accordance with techniques described in this disclosure, when router 20 is operating as an edge router, user 18 may configure QoS mapping tables 36 defined to map customer DSCP markings to service provider double EXP QoS markings for corresponding QoS profiles. In this case, user 18 may also configure QoS policies 34 defined to map the DSCP markings to the plurality of QoS profiles.

RPD 28 executes one or more interior and/or exterior routing protocols to exchange routing information with other network devices, store received routing information in a routing table 30, and store derived forwarding information in a forwarding table 32. In this way, routing engine 22 maintains routing table 30 that describes the topology and routes through MPLS core network 10. In addition, routing engine 22 analyzes routes stored in routing table 30 and generates forwarding table 32. According to the techniques described in this disclosure, routing engine 22 may generate forwarding table 32 based on routing table 30 and QoS policies 34 by applying QoS policies 34 to associate each of the plurality of QoS profiles with a set of routes in routing table 30. For example, when router 20 is operating as a core router, QoS policies 34 may specify that packets with a double EXP QoS marking identifying a particular QoS profile (e.g., "mission-critical" or "best-effort") should use a particular set of routes in routing table 30. Kernel 23 installs a copy of forwarding table 32 maintained by routing engine 22 into forwarding table 40 of forwarding engine 38.

Forwarding engine 28 uses forwarding table 40 to forward packets received via inbound links 46 to next hop routers, i.e., neighboring devices coupled to outbound links 48. Forwarding tables 32, 40 may include next hop data indicating appropriate next hop routers within MPLS core network 10 for each of the routes stored in routing table 30 and each of the QoS profiles defined by QoS policies 34. In some cases, forwarding tables 32, 40 may indicate the specific output interface of one of IFCs 44 associated with the indicated next hop router and also indicate an output queue of the output interface for forwarding the packet in accordance with the corresponding QoS profile. Routing table 30 and forwarding tables 32, 40 may be maintained in the form of one or more tables, databases, link lists, radix trees, databases, flat files, or any other data structures.

In the case where router 20 operates as an edge router, router 20 receives traffic having a DSCP marking on an incoming interface of one of IFCs 44 from a customer device. Forwarding engine 38 may apply QoS policies 34 to identify a QoS profile for the received traffic based on the DSCP marking. Forwarding engine 38 encapsulates the received traffic in an MPLS packet and applies QoS mapping tables 36 to map the DSCP marking to a double EXP QoS marking to provide full resolution, end-to-end QoS over MPLS core network 10. For example, forwarding engine 38 maps a first portion of the DSCP marking to a first EXP field of a first label included in a MPLS header of the MPLS packet, and maps a second portion of the DSCP marking to a second EXP field of a second label included in the MPLS header. In some examples, the first label and the second label may comprise any two of a transport label, a service label, an entropy label, and an explicit null label, which are conventionally used by forwarding engine 38 to forward traffic and provide customer services, such as load balancing. In other examples, the first label and/or the second label may comprise different types of labels, not listed above, that are included in the MPLS header.

Forwarding engine 38 then selects a next hop router for the MPLS packet from forwarding table 40, and forwards the MPLS packet to the next hop router in the MPLS network according to the identified QoS profile. For example, forwarding engine 38 forwards the MPLS packet to an output interface of one of IFCs 44 associated with the selected next hop router, and selects an output queue of the output interface for the MPLS packet corresponding to the QoS profile identified by the DSCP marking for the customer traffic.

In the case where router 20 operates as a core router, router 20 receives a MPLS packet having a double EXP QoS marking on an incoming interface of one of IFCs 44 from a neighboring device in MPLS core network 10. Forwarding engine 38 looks at the MPLS header of the received MPLS packet and reads a first label with a first EXP field and a second label with a second EXP field. In some examples, the first label and the second label may comprise any two of a transport label, a service label, an entropy label, and an explicit null label. In other examples, the first label and/or the second label may comprise different types of labels, not listed above, that are included in the MPLS header.

Forwarding engine 38 may apply QoS policies 34 to identify a QoS profile for the received MPLS packet based on a combination of the first EXP field and the second EXP field. In some cases, the combination of the first EXP field and the second EXP field may comprise a concatenation of the bits included in the first EXP field and the bits included in the second EXP field. For example, the first EXP field may include a set of most significant bits used to identify the QoS profile for the MPLS packet and the second EXP field may include a set of least significant bits used to identify the QoS profile for the MPLS packet. The first set of bits included in the first EXP field may correspond to a first portion of a DSCP marking for the traffic encapsulated in the MPLS packet, and the second set of bits included in the second EXP field may correspond to a second portion of the DSCP marking for the traffic encapsulated in the MPLS packet.

Forwarding engine 38 then selects a next hop router for the received MPLS packet from forwarding table 40 based at least one of the first label and the second label, and the identified QoS profile, and forwards the MPLS packet to the next hop router in the MPLS network according to the identified QoS profile. For example, forwarding engine 38 forwards the MPLS packet to an output interface of one of IFCs 44 associated with the selected next hop router, and selects an output queue of the output interface for the MPLS packet corresponding to the QoS profile identified by the combination of the first EXP field and the second EXP field.

The architecture of router 20 illustrated in FIG. 2 is shown for exemplary purposes only. The disclosure is not limited to this architecture. In other embodiments, router 20 may be configured in a variety of ways. In one embodiment, for example, some of the functionally of routing engine 22 may be distributed within forwarding engine 38 and one or more other packet forwarding engines (PFEs) included in router 20. Elements of routing engine 22 may be implemented solely in software, or hardware, or may be implemented as combinations of software, hardware, or firmware. For example, routing engine 22 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of routing engine 22 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 20, e.g., daemons 24. Routing engine 22, in some examples, retrieves and executes the instructions from memory for these aspects.

Figure 3:
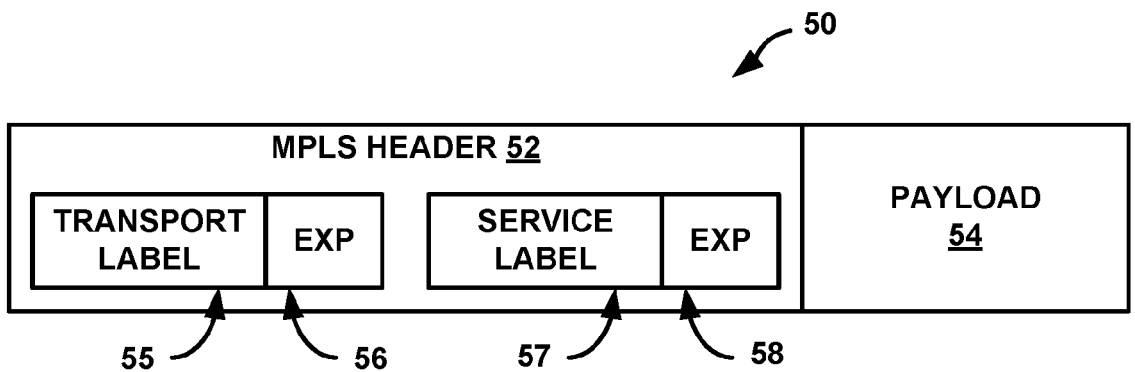
FIG. 3 is a conceptual diagram illustrating an example MPLS packet including a double EXP QoS marking.

FIG. 3 is a conceptual diagram illustrating an example MPLS packet 50 including a double EXP QoS marking. MPLS packet 50 has a MPLS header 52 and a payload 54. In some examples, payload 54 may include IP packets or other traffic encapsulated in MPLS packet 50 for forwarding across a MPLS network, such as MPLS core network 10 from FIG. 1. In one specific example, MPLS packet 50 encapsulates IP packets including DSCP markings that identify a QoS profile for the IP packets. In the illustrated example of FIG. 3, MPLS header 52 includes a transport label 55 with a first EXP field 56 and a service label 57 with a second EXP field 58. In general, core routers in a MPLS network, e.g., core routers 13 in MPLS core network 10, use transport label 55 to switch or forward traffic across the MPLS network. In addition, many L3VPN applications require at least two labels, e.g., transport label 55 and service label 57, to operate in the MPLS network.

According to the techniques described in this disclosure, first EXP field 56 of transport label 55 includes a first set of bits, e.g., three bits, corresponding to a first portion of a DSCP marking for traffic encapsulated in MPLS packet 50. For example, the three bits of first EXP field 56 may include the three most significant bits of the six-bit DSCP marking. Second EXP field 58 of service label 57 includes a second set of bits, e.g., three bits, corresponding to a second portion of the DSCP marking for traffic encapsulated in MPLS packet 50. For example, the three bits of second EXP field 58 may include the three least significant bits of the six-bit DSCP marking. In this way, the combination of first EXP field 56 of transport label 55 and second EXP field 58 of service label 57 identifies the same QoS profile for MPLS packet 50 as identified by the DSCP marking for the traffic encapsulated in MPLS packet 50.

Figure 4:
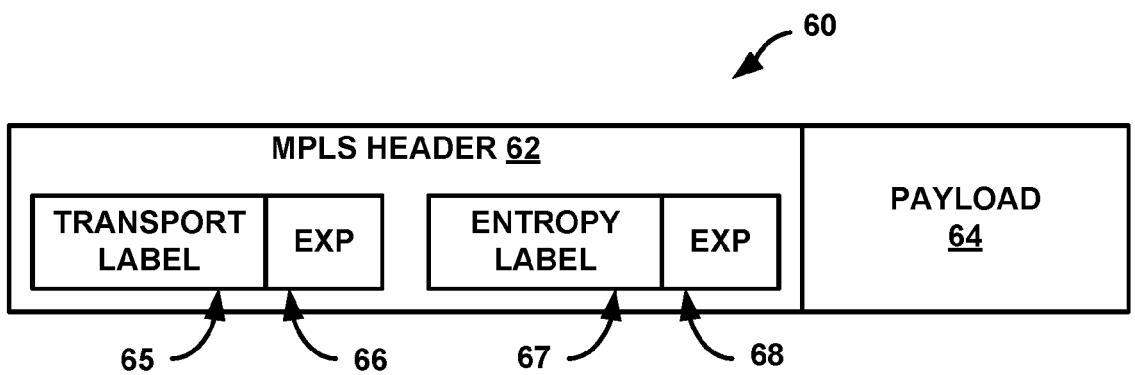
FIG. 4 is a conceptual diagram illustrating another example MPLS packet including a double EXP QoS marking.

FIG. 4 is a conceptual diagram illustrating another example MPLS packet 60 including a double EXP QoS marking. MPLS packet 60 has a MPLS header 62 and a payload 64. Similar to MPLS packet 50 from FIG. 3, MPLS packet 60 encapsulates IP packets or other traffic in payload 64 including DSCP markings that identify a QoS profile for the traffic. In the illustrated example of FIG. 4, MPLS header 62 includes a transport label 65 with a first EXP field 66 and an entropy label 67 with a second EXP field 68. As described above, core routers in a MPLS network use transport label 65 to switch or forward traffic across the MPLS network. In addition, the core routers use entropy label 67 to perform load balancing for traffic forwarding across the MPLS network.

According to the techniques described in this disclosure, first EXP field 66 of transport label 65 includes a first set of bits, e.g., three bits, corresponding to a first portion of a DSCP marking for traffic encapsulated in MPLS packet 60. For example, the three bits of first EXP field 66 may include the three most significant bits of the six-bit DSCP marking. Second EXP field 68 of entropy label 67 includes a second set of bits, e.g., three bits, corresponding to a second portion of the DSCP marking for traffic encapsulated in MPLS packet 60. For example, the three bits of second EXP field 68 may include the three least significant bits of the six-bit DSCP marking. In this way, the combination of first EXP field 66 of transport label 65 and second EXP field 68 of entropy label 67 identifies the same QoS profile for MPLS packet 60 as identified by the DSCP marking for the traffic encapsulated in MPLS packet 60.

Figure 5:
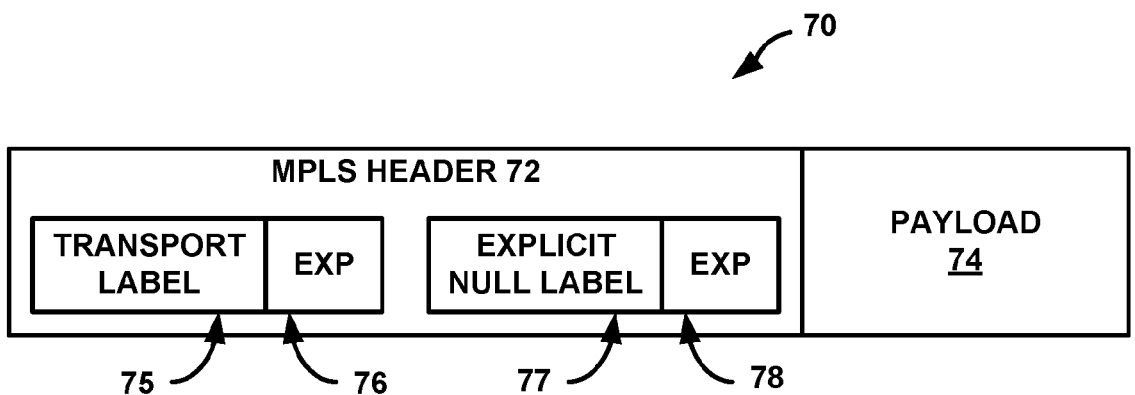
FIG. 5 is a conceptual diagram illustrating another example MPLS packet including a double EXP QoS marking.

FIG. 5 is a conceptual diagram illustrating another example MPLS packet 70 including a double EXP QoS marking. MPLS packet 70 has a MPLS header 72 and a payload 74. Similar to MPLS packet 50 from FIG. 3 and MPLS packet 60 from FIG. 4, MPLS packet 70 encapsulates IP packets or other traffic in payload 74 including DSCP markings that identify a QoS profile for the traffic. In the illustrated example of FIG. 5, MPLS header 72 includes a transport label 75 with a first EXP field 76 and an explicit null label 77 with a second EXP field 78. As described above, core routers in a MPLS network use transport label 75 to switch or forward traffic across the MPLS network. In addition, the core routers may use explicit null label 77 to implement traffic forwarding with ultimate hop popping so that the label is removed at an egress edge router of the MPLS network, e.g., edge router 14 of MPLS network 10 from FIG. 1, instead of being removed at a penultimate core router, e.g., core router 13C. In this way, MPLS packet 70 may always include explicit null label 77 when traversing the MPLS network such that explicit null label 77 is carried in MPLS packet 70 from an ingress edge router of the MPLS network to the egress edge router.

According to the techniques described in this disclosure, first EXP field 76 of transport label 75 includes a first set of bits, e.g., three bits, corresponding to a first portion of a DSCP marking for traffic encapsulated in MPLS packet 70. For example, the three bits of first EXP field 76 may include the three most significant bits of the six-bit DSCP marking. Second EXP field 78 of explicit null label 77 includes a second set of bits, e.g., three bits, corresponding to a second portion of the DSCP marking for traffic encapsulated in MPLS packet 70. For example, the three bits of second EXP field 78 may include the three least significant bits of the six-bit DSCP marking. In this way, the combination of first EXP field 76 of transport label 75 and second EXP field 78 of explicit null label 77 identifies the same QoS profile for MPLS packet 70 as identified by the DSCP marking for the traffic encapsulated in MPLS packet 70.

FIGS. 6A-6B are conceptual diagrams illustrating example QoS mapping tables of customer QoS markings, service provider double EXP QoS markings, and QoS profiles maintained by router 20 from FIG. 2. FIG. 6A illustrates a mapping table 81 of service provider internal double EXP QoS markings to priority levels, e.g., high or low, for corresponding QoS profiles. The service provider maintains mapping table 81 as an internal mapping of the service provider's defined markings and corresponding priorities. In the example of FIG. 6A, a top EXP field value of 111 combined with a bottom EXP field value of 111 is mapped to a highest priority QoS profile by the service provider. In addition, a top EXP field value of 000 combined with a bottom EXP field value of 000 is mapped to a lowest priority QoS profile by the service provider.

FIG. 6B illustrates a mapping table 83 of customer DSCP markings to service provider internal double EXP QoS markings to priority levels for corresponding QoS profiles. Although, as described with respect to FIG. 6A, the service provider maintains internal double EXP QoS markings, the service provider may allow each of their customers to define their own QoS markings and corresponding priorities. In this way, different customers may define the same QoS markings as having different corresponding priority levels.

In one example illustrated in FIG. 6B, customer A 85 maps DSCP marking 111111 to a highest priority QoS profile, and DSCP marking 000000 to a lowest priority QoS profile. Customer A's markings, therefore, match the service provider's internal markings such that the DSCP markings can be mapped directly to the top EXP field and the bottom EXP field. In the case of the highest priority QoS profile, the three most significant bits of the customer's highest priority DSCP marking (i.e., 111) are mapped directly to the service provider's highest priority top EXP field marking 111, and the three least significant bits of the customer's highest priority DSCP marking (i.e., 111) are mapped directly to the service provider's highest priority bottom EXP field marking 111. Similarly, in the case of the lowest priority QoS profile, the three most significant bits of the customer's lowest priority DSCP marking (i.e., 000) are mapped directly to the service provider's lowest priority top EXP field marking 000, and the three least significant bits of the customer's lowest priority DSCP marking (i.e., 000) are mapped directly to the service provider's lowest priority bottom EXP field marking 000.

In another example illustrated in FIG. 6B, customer B 87 maps DSCP marking 000000 to a highest priority QoS profile, and DSCP marking 111111 to a lowest priority QoS profile. Customer B's markings, therefore, are the exact opposite of the service provider's internal markings such that the DSCP markings are modified to conform to values of the top EXP field and the bottom EXP field defined by the service provider for the same priority level. In the case of the highest priority QoS profile, the three most significant bits of the customer's highest priority DSCP marking (i.e., 000) are modified and mapped to the service provider's highest priority top EXP field marking 111, and the three least significant bits of the customer's highest priority DSCP marking (i.e., 000) are modified and mapped to the service provider's highest priority bottom EXP field marking 111. Similarly, in the case of the lowest priority QoS profile, the three most significant bits of the customer's lowest priority DSCP marking (i.e., 111) are modified and mapped to the service provider's lowest priority top EXP field marking 000, and the three least significant bits of the customer's lowest priority DSCP marking (i.e., 111) are modified and mapped to the service provider's lowest priority EXP field marking 000.

Figure 7:
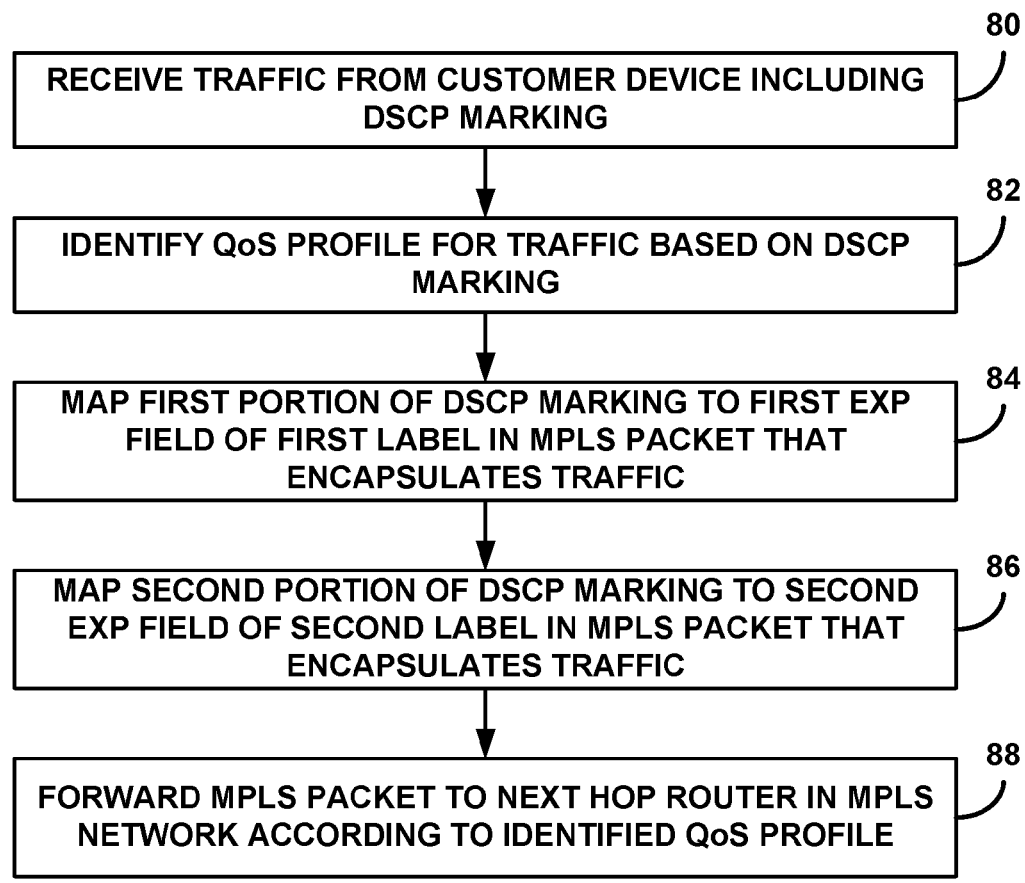
FIG. 7 is a flowchart illustrating an example operation of an ingress edge router mapping customer QoS markings to service provider double EXP QoS markings for forwarding MPLS packets over a MPLS network.

FIG. 7 is a flowchart illustrating an example operation of an edge router mapping customer QoS markings to service provider double EXP QoS markings for forwarding MPLS packets over a MPLS network. The operation is described with respect to router 20 from FIG. 2 operating as an ingress edge router of an MPLS network. In other examples, edge routers having different architectures than router 20 may be configured to perform the example operation illustrated in FIG. 7.

Router 20 receives traffic on an incoming interface of one of IFCs 44 from a customer device, e.g., customer device 16A from FIG. 1, where the traffic includes a DSCP marking (80). In some examples, the customer traffic may comprise IP packets to be forwarded over the MPLS network. Forwarding engine 38 of router 20 identifies a QoS profile for the received traffic based on the DSCP marking (82). For example, routing engine 22 of router 20 may maintain QoS policies defined to map DSCP markings to a plurality of QoS profiles.

According to the techniques described in this disclosure, forwarding engine 38 of router 20 maps a first portion of the DSCP marking to a first EXP field of a first label included in a MPLS packet that encapsulates the received traffic (84). Forwarding engine 38 of router 20 also maps a second portion of the DSCP marking to a second EXP field of a second label included in the MPLS packet that encapsulates the received traffic (86). The first label and the second label are included in a MPLS header of the MPLS packet and, in some examples, may comprise any two of a transport label, a service label, an entropy label, and an explicit null label. In other examples, the first label and/or the second label may comprise different types of labels, not listed above, that are included in the MPLS header.

In some cases, forwarding engine 38 may perform the mapping by applying QoS mapping tables 36 to the DSCP marking for the received traffic. Routing engine 22 of router 20 may maintain QoS mapping tables 36 defined to map customer DSCP markings to service provider double EXP QoS markings for corresponding QoS profiles. For example, forwarding engine 38 may map a set of most significant bits of the DSCP marking of the received customer traffic to a first set of bits included in the first EXP field of the first label, and map a set of least significant bits of the DSCP marking to a second set of bits included in the second EXP field of the second label. In another example, where the DSCP marking for the received customer traffic conforms to a customer specific marking that is different than a service provider internal marking for a given priority, forwarding engine 38 may set the first EXP field of the MPLS packet to be equal to a first portion of the service provider internal marking for the same priority as the customer specific marking, and set the second EXP field of the MPSL packet to be equal to a second portion of the service provider internal marking for the same priority as the customer specific marking.

Forwarding engine 38 of router 20 selects a next hop router for the MPLS packet from forwarding table 40, and forwards the MPLS packet to the next hop router in the MPLS network according to the identified QoS profile (88). For example, forwarding engine 38 forwards the MPLS packet to an output interface of one of IFCs 44 associated with the selected next hop router, and selects an output queue of the output interface for the MPLS packet corresponding to the QoS profile identified by the DSCP marking for the customer traffic.

Figure 8:
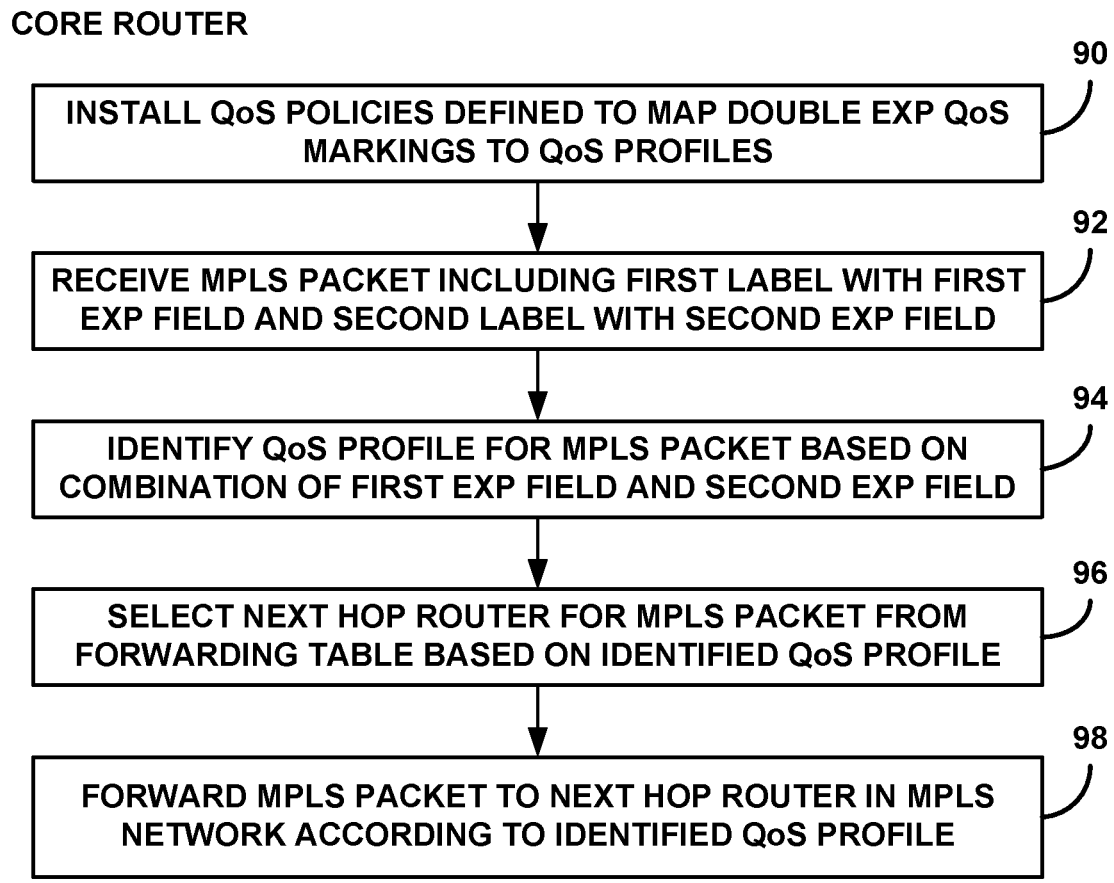
FIG. 8 is a flowchart illustrating an example operation of a core router forwarding MPLS packets over a MPLS network based on double EXP QoS markings.

FIG. 8 is a flowchart illustrating an example operation of a core router forwarding MPLS packets over a MPLS network based on double EXP QoS markings. The operation is described with respect to router 20 from FIG. 2 operating as a core router of an MPLS network. In other examples, core routers having different architectures than router 20 may be configured to perform the example operation illustrated in FIG. 8.

Router 20 installs QoS policies 34 defined to map double EXP QoS markings to QoS profiles (90). For example, router 20 may receive QoS policies 34 from user 18, e.g., a system administrator for the service provider, via CLI 26. As described in this disclosure, the QoS policies 34 are defined to map combinations of at least two EXP fields to a plurality of QoS profiles. Upon receipt, routing engine 22 of router 20 installs QoS policies 34 in a data structure. In addition, routing engine 22 may generate forwarding table 32 based on routing table 30 and QoS policies 34 by applying QoS policies 34 to associate each of a plurality of QoS profiles with a set of routes in routing table 30. Kernel 23 then installs a copy of forwarding table 32 maintained by routing engine 22 into forwarding table 40 of forwarding engine 38.

Router 20 receives a MPLS packet on an incoming interface of one of IFCs 44, where the MPLS packet includes a first label with a first EXP field and a second label with a second EXP field (92). The first label and the second label are included in a MPLS header of the received MPLS packet and, in some examples, may comprise any two of a transport label, a service label, an entropy label, and an implicit null label. In other examples, the first label and/or the second label may comprise different types of labels, not listed above, that are included in the MPLS header. Forwarding engine 38 of router 20 identifies a QoS profile for the received MPLS packet based on a combination of the first EXP field and the second EXP field (94). Forwarding engine 38 may apply QoS policies 34 to map the combination of the first EXP field and the second EXP field to the corresponding QoS profile.

In some cases, the combination of the first EXP field and the second EXP field may comprise a concatenation of the bits included in the first EXP field and the bits included in the second EXP field. For example, the first EXP field may include a set of most significant bits used to identify the QoS profile for the MPLS packet and the second EXP field may include a set of least significant bits used to identify the QoS profile for the MPLS packet. The first set of bits included in the first EXP field may correspond to a first portion of a DSCP marking for the traffic encapsulated in the MPLS packet, and the second set of bits included in the second EXP field may correspond to a second portion of the DSCP marking for the traffic encapsulated in the MPLS packet.

Forwarding engine 38 of router 20 selects a next hop router for the received MPLS packet from forwarding table 40 based at least on the identified QoS profile (96). In order to select the next hop router, forwarding engine 38 may determine an entry in forwarding table 40 corresponding to at least one of the first label and the second label, and the QoS profile identified by the combination of the first EXP field and the second EXP field. Forwarding engine 38 then forwards the MPLS packet to the next hop router in the MPLS network according to the identified QoS profile (98). For example, forwarding engine 38 forwards the MPLS packet to an output interface of one of IFCs 44 associated with the selected next hop router, and selects an output queue of the output interface for the MPLS packet corresponding to the QoS profile identified by the combination of the first EXP field and the second EXP field.

The flowcharts illustrated in FIG. 7 and FIG. 8 represent example operations of the techniques of this disclosure described above as a series of steps. The example operations should be construed as examples and the techniques of this disclosure should not be limited to the order or number of steps included in the example operations describe above. In other examples, the techniques of this disclosure may include more or fewer steps and/or steps performed in a different order than described above.

In one or more examples, the functions described may be implemented in hardware, software, firmware, or any combination thereof. If implemented in software, the functions may be stored or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Various components, modules, or units are described in this disclosure to emphasize functional aspects of devices, e.g., edge routers and/or core routers, configured to perform the disclosed techniques, but do not necessarily require realization by different hardware units. Rather, as described above, various units may be combined in device hardware units or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, by a routing device, a Multiprotocol Label Switching (MPLS) packet that includes a first label with a first experimental (EXP) field and a second label with a second EXP field; and
identifying, by the routing device and based on the first EXP field and the second EXP field, a quality of service (QoS) profile for use in selecting a next hop router for the MPLS packet.

2. The method of claim 1, further comprising:
forwarding the MPLS packet to an output interface associated with the next hop router; and
selecting an output queue of the output interface for the MPLS packet based on the identified QoS profile.

3. The method of claim 1, further comprising:
selecting the next hop router for the MPLS packet by selecting an entry in a forwarding table of the routing device that corresponds to the identified QoS profile and at least one of the first label and the second label.

4. The method of claim 1, further comprising:
receiving, at the routing device, QoS policies defined to map combinations of at least two EXP fields to a plurality of QoS profiles; and
installing the QoS policies in the routing device,
wherein identifying the QoS profile for use in selecting the next hop router for the MPLS packet comprises applying the QoS policies to map the combination of the first EXP field and the second EXP field to the QoS profile.

5. The method of claim 1, wherein the first EXP field includes a set of most significant bits used to identify the QoS profile for the MPLS packet, and wherein the second EXP field includes a set of least significant bits used to identify the QoS profile for the MPLS packet.

6. The method of claim 1, wherein the first EXP field includes a first set of bits corresponding to a first portion of a Differentiated Services Code Point (DSCP) marking for traffic encapsulated in the MPLS packet, and wherein the second EXP field includes a second set of bits corresponding to a second portion of the DSCP marking for the traffic encapsulated in the MPLS packet.

7. The method of claim 1, wherein the first label comprises a transport label, and wherein the second label comprises one of a service label, an entropy label, or an explicit null label.

8. A routing device comprising:
an interface for receiving a Multiprotocol Label Switching (MPLS) packet that includes a first label with a first experimental (EXP) field and a second label with a second EXP field; and
a forwarding engine including processing circuitry configured to identify, based on the first EXP field and the second EXP field, a quality of service (QoS) profile for use in selecting a next hop router for the MPLS packet.

9. The routing device of claim 8, wherein the processing circuitry included in the forwarding engine is configured to:
forward the MPLS packet to an output interface of the routing device associated with the next hop router; and
select an output queue of the output interface for the MPLS packet based on the identified QoS profile.

10. The routing device of claim 8, wherein the processing circuitry included in the forwarding engine is configured to select an entry in a forwarding table of the routing device that corresponds to the identified QoS profile and at least one of the first label and the second label.

11. The routing device of claim 8, further comprising a routing engine including one or more processors configured to execute a command line interface (CLI) for receiving QoS policies defined to map combinations of at least two EXP fields to a plurality of QoS profiles, and install the QoS policies in a data structure of the routing device, and wherein the processing circuitry included in the forwarding engine applies the QoS policies to map the combination of the first EXP field and the second EXP field to the QoS profile.

12. The routing device of claim 8, wherein the first EXP field includes a set of most significant bits used to identify the QoS profile for the MPLS packet, and wherein the second EXP field includes a set of least significant bits used to identify the QoS profile for the MPLS packet.

13. The routing device of claim 8, wherein the first EXP field includes a first set of bits corresponding to a first portion of a Differentiated Services Code Point (DSCP) marking for traffic encapsulated in the MPLS packet, and wherein the second EXP field includes a second set of bits corresponding to a second portion of the DSCP marking for the traffic encapsulated in the MPLS packet.

14. The routing device of claim 8, wherein the first label comprises a transport label, and wherein the second label comprises one of a service label, an entropy label, or an explicit null label.

15. A non-transitory computer-readable storage medium comprising instructions that when executed cause one or more processors of a routing device to:
receive a Multiprotocol Label Switching (MPLS) packet that includes a first label with a first experimental (EXP) field and a second label with a second EXP field; and
identify, based on the first EXP field and the second EXP field, a quality of service (QoS) profile for use in selecting a next hop router for the MPLS packet.

* * * * *